US008054826B2

(12) United States Patent
Cheng et al.

(10) Patent No.: US 8,054,826 B2
(45) Date of Patent: Nov. 8, 2011

(54) CONTROLLING SERVICE QUALITY OF VOICE OVER INTERNET PROTOCOL ON A DOWNLINK CHANNEL IN HIGH-SPEED WIRELESS DATA NETWORKS

(75) Inventors: Fang-Chen Cheng, Randolph, NJ (US); James Paul Seymour, Lisle, IL (US)

(73) Assignee: Alcatel Lucent, Paris (FR)

( * ) Notice: Subject to any disclaimer, the term of this patent is extended or adjusted under 35 U.S.C. 154(b) by 1559 days.

(21) Appl. No.: 11/194,063

(22) Filed: Jul. 29, 2005

(65) Prior Publication Data

US 2007/0025264 A1 Feb. 1, 2007

(51) Int. Cl.
*H04L 12/66* (2006.01)

(52) U.S. Cl. ........ 370/352; 370/335; 370/338; 370/347; 370/401; 455/450; 455/436; 455/438; 455/445

(58) Field of Classification Search ................ 370/335, 370/338, 331, 352, 328, 231, 395, 401, 347; 463/16, 25; 455/552, 69, 450, 436, 403, 455/550, 414, 437, 445, 438; 219/121; 140/88; 229/72
See application file for complete search history.

(56) References Cited

U.S. PATENT DOCUMENTS

| | | | | |
|---|---|---|---|---|
| 6,072,994 | A * | 6/2000 | Phillips et al. | 455/84 |
| 6,298,057 | B1 * | 10/2001 | Guy et al. | 370/389 |
| 6,882,637 | B1 * | 4/2005 | Le et al. | 370/349 |
| 6,898,437 | B1 * | 5/2005 | Larsen et al. | 455/522 |
| 2003/0108033 | A1 * | 6/2003 | Raisanen et al. | 370/352 |
| 2003/0131303 | A1 * | 7/2003 | Kim et al. | 714/755 |
| 2003/0161294 | A1 * | 8/2003 | Yepez et al. | 370/352 |
| 2004/0095907 | A1 * | 5/2004 | Agee et al. | 370/334 |
| 2004/0116140 | A1 * | 6/2004 | Babbar et al. | 455/517 |
| 2005/0041660 | A1 * | 2/2005 | Pennec et al. | 370/389 |
| 2005/0094645 | A1 * | 5/2005 | Sridhar et al. | 370/395.42 |
| 2005/0157678 | A1 * | 7/2005 | Mantha et al. | 370/329 |
| 2005/0195750 | A1 * | 9/2005 | Le et al. | 370/252 |
| 2006/0268713 | A1 * | 11/2006 | Lundstrom | 370/235 |
| 2006/0268865 | A1 * | 11/2006 | Yokota | 370/389 |

(Continued)

OTHER PUBLICATIONS

ITU-T Recommendation G.114: "One-way transmission time", Jan. 2003.

(Continued)

*Primary Examiner* — Nick Corsaro
*Assistant Examiner* — Mahendra Patel
(74) *Attorney, Agent, or Firm* — Williams, Morgan & Amerson (57) ABSTRACT

The present invention provides a method and an apparatus for controlling service quality of data communications in a wireless network in which quality of service control for voice over internet protocol packets is provided on a downlink shared channel. A method is provided for a wireless communications between at least a first and a second service user. The method comprises prioritizing transmission of voice over internet protocol packets for the first and second service users over a shared downlink channel based on a first end-to-end delay that the first service user experiences relative to a second end-to-end delay that the second service user experiences. For example, such a priority adaptation may provide quality of service control for voice over internet protocol over a high-speed downlink packet access channel based on an end-to-end delay that a mobile-to-mobile user may be currently experiencing relative to a mobile-to-land user. In this way, a scheduler at a base station of a communications system may maximize use of voice over internet protocol capacity while maintaining an acceptable level of end-to-end delay for different users of mobile stations.

24 Claims, 6 Drawing Sheets

U.S. PATENT DOCUMENTS

| | | | |
|---|---|---|---|
| 2007/0165610 A1* | 7/2007 | Tseng et al. | 370/356 |
| 2009/0316580 A1* | 12/2009 | Pang et al. | 370/235 |
| 2010/0142412 A1* | 6/2010 | Synnergren et al. | 370/261 |
| 2010/0238825 A1* | 9/2010 | Zhang et al. | 370/252 |

OTHER PUBLICATIONS

3GPP TS23.107 "QoS Concepts and Architecture." Sep. 2004.

* cited by examiner

CONTROLLING SERVICE QUALITY OF VOICE OVER INTERNET PROTOCOL ON A DOWNLINK CHANNEL IN HIGH-SPEED WIRELESS DATA NETWORKS

FIELD OF THE INVENTION

This invention relates generally to telecommunications, and more particularly, to wireless communications.

DESCRIPTION OF THE RELATED ART

Besides access to electronic information and resources available at various websites or portals, the Internet offers several user applications. For example, the Internet enables an Internet user to have a telephone conversation over Internet Protocol (IP) networks instead of dedicated voice transmission lines. That is, by essentially paying fixed monthly charges for an Internet connection, Internet users may call practically anywhere in the world. Accordingly, one rapidly emerging application of the Internet is telephony, which is commonly called voice-over Internet Protocol (VoIP).

For providing telephony services, the Internet delivers voice to users by sending voice information in a digital form, such as voice packets rather than using a traditional set of circuit-committed protocols of Public Switched Telephone Network (PSTN). VoIP uses Internet Protocol (IP) for transmission of voice packets over packet-switched networks that employ one or more communication and network protocols capable of managing the transmission of the voice packets over an IP network that is a resource-shared network instead of a resource-dedicated network, such as the PSTN. Therefore, IP-network based VoIP applications provide a relatively cost-efficient platform for a variety of applications and services.

One typical application of VoIP is to enable Internet telephony, also sometimes referred to IP telephony, over the IP network. The International Telecommunication Union (ITU) specifies a VoIP standard in H.323 protocol for multimedia communications over packet-based data networks including Local Area Network (LANs) or Wide Area Networks (WANs).

For some wireless telecommunications, such as cellular telephony, communications between base stations and mobile devices occur via a radio frequency (RF) system over an interface. High speed wireless shared access channels are designed to effectively transport data packet through air interface in the wireless telecommunication systems. However, VoIP service over high speed wireless shared access channels degrades the RF efficiency due to its small packet size, which often leads to a poor transport packing efficiency. A VoIP service typically sends packets of digitized voice as another form of data over IP networks. A VoIP service expects timely packet delivery with low delay. However, IP networks are designed to support non-real time applications, such as file transfer or e-mail. Since these non-real time applications typically involve bursty traffic and demand relatively high bandwidth only at burst times, most IP networks are not sensitive enough to delay or delay variation for a VoIP service.

One type of delay for VoIP telephony, sometimes referred to an end-to-end delay, is the time required for a signal generated at a talker's device to traverse the IP network and reach a listener's device. End-to-end delay performance may characterize a VoIP system. For example, end-to-end delay provides a critical voice quality index of user satisfaction in the VoIP system. However, many factors may contribute to the end-to-end delay since the end-to-end delay may be the sum of the delays at the different network devices and across the network links through which voice traffic passes.

Newer high-speed wireless systems, such as 1xEV-DO through Rev.0 of Third Generation (3G) Partnership Project 2 (3GPP2) and High-speed Downlink Packet Access (HSDPA) through Release 5 of Third Generation Partnership Project (3GPP) have significantly improved data capacity and user performance compared to their successor technologies (such as, 3G1x and R'99 Universal Mobile Telecommunication System (UMTS), respectively). A further significant evolution of these 3G systems supports VoIP through 1xEV-DO Rev. A in 3GPP2 and through the Rel'6 E-DCH feature in 3GPP. These evolutions of the 3GPP and 3GPP2 standards cause the uplink channels to become more symmetrical with the downlink channels, providing substantially efficient VoIP services with capacities comparable to circuit-switched voice capacities.

However, improvement in capacity of a VoIP service may come at the expense of an increase in end-to-end delay compared to circuit-switched voice. For example, the high-speed packet access channels defined in EV-DO Rev. A and HSDPA/E-DCH allow packetized voice transport for VoIP with statistical multiplexing and radio channel dependent type resource management to improve radio resource utilization and thereby increase the VoIP system capacity. However, unlike circuit-switched voice channels, the packetized transport of VoIP introduces variable delay or delay jitter. Accordingly, some VoIP voice frames may experience unacceptably long delays before a successful reception thereof. Likewise, user scheduling and a hybrid automatic repeat request (HARQ) process of high-speed packet access in HSDPA-EDCH/EV-DO/DV-DV provides higher efficiency in radio resource utilization but introduces variable delay. This variable delay is often acceptable for many data services that are delay tolerable (e.g., a Hyper Text Transfer Protocol (HTTP) based Internet access, such as e-mail). However, for real time delay sensitive services, such as VoIP services, a given maximum delay threshold is to be generally adhered to.

Another approach for improving VoIP capacity of a VoIP service involves an air interface delay and variation thereof by a user. Specifically, an end-to-end delay analysis of VoIP over HSDPA-EDCH/EV-DO/EV-DV typically evaluates the air interface delay through the high-speed packet shared channel, while adding to the air-interface delay the mean of the processing delay, random network delay, and IP core network delay. However, calls between two mobile device users or a mobile device user and a land user may use air interface differently. That is, while a mobile-to-mobile call traverses two separate air interfaces, a mobile-to-land call traverses a single air interface. This disparity in use of the air interface generally doubles the air-interface delay experienced by a mobile-to-mobile call user relative to a mobile-to-land call. An additional delay may be associated with mobile-to-mobile calls, however, if voice encoding/decoding is performed twice (i.e., without transcoder free operation). As a result, mobile-to-mobile calls typically experience significantly larger end-to-end delay than mobile-to-land calls.

For a circuit voice system, a network is designed to provide an acceptable end-to-end delay for the worst case scenario (i.e., the mobile-to-mobile users), while providing delay margin for the non-worst case scenario (i.e., the mobile-to-land users). Given the dedicated channel nature of circuit voice networks, it is difficult to take advantage of the delay margin for mobile-to-land users. Various factors, likewise, may affect system design and system capacity measure for VoIP over a High-speed Downlink Packet Access (HSDPA) channel or an enhanced dedicated uplink channel (E-DCH) in an EV-DO or EV-DV protocol based communications system. In particular, a single or a dual scheduler delay significantly impacts the system design and system capacity measure. To this end, one methodology based on an additive delay measure provides a simple guideline for measuring an interface capacity of VoIP over HSDPA-EDCH/EV-DO/EV-DV.

More specifically, use of Erlang capacity that generally provides a dimensionless measure of traffic capacity, intensity, volume or average traffic density in wireless telecommunications, or cellular networks, may provide capacity measure of the VoIP over HSDPA-EDCH/EV-DO/EV-DV. As such, one Erlang is equivalent to the number of simultaneous calls averaged over a period of time, one telephone line being permanently used, or the number of simultaneous calls in progress at any given time. The Erlang capacity may be calculated as a rate at which calls arrive divided by the rate at which the arrived calls are completed, effectively providing a way to determine the capacity to carry one phone call.

Accordingly, if a communications system is designed based on a worst case scenario with end-to-end delay budgeted for dual scheduler delays for mobile-to-mobile calls; the Erlang capacity of the VoIP would be relatively lower. However, this system would be under utilized if not all users are making mobile-to-mobile calls. For a communications system design that is based on the single scheduler delay, the Erlang capacity of the VoIP would be relatively higher. However, such a communications system leads to relatively less satisfactory mobile-to-mobile VoIP service users at the system capacity.

Thus, both scenarios set forth above may incompletely characterize the system capacity of a VoIP communications system in a dynamic wireless environment. In a downlink channel, for example, these scenarios cannot reduce the scheduler delay for a service user experiencing a relatively long delay, which includes the delay in a fixed network. Likewise, in these scenarios, a VoIP communications system may fail to decrease other scheduling delays at an uplink channel. As a result, such a VoIP communications system may fail to satisfy a desired voice delay criteria in the two scenarios.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is directed to overcoming, or at least reducing, the effects of, one or more of the problems set forth above.

In one embodiment of the present invention, a method is provided for a wireless communications between at least a first and a second service user. The method comprises prioritizing transmission of voice over internet protocol packets for the first and second service users over a shared downlink channel based on a first end-to-end delay that the first service user experiences relative to a second end-to-end delay that the second service user experiences.

In yet another embodiment, a method is provided for controlling service quality of data communications in a wireless network. The method comprises providing an indication of a first end-to-end delay that a first service user experiences, over a downlink channel shared with a second service user, relative to a second end-to-end delay that the second service user experiences for prioritizing transmission of voice over internet protocol packets associated with the first and second service users based on the first and second end-to-end delays.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it should be appreciated that such a development effort might be complex and time-consuming, but may nevertheless be a routine undertaking for those of ordinary skill in the art having the benefit of this disclosure.

Generally, a method and an apparatus are provided for a wireless communications between at least a first and a second service user. Transmission of Voice over Internet Protocol (VoIP) for the first and second users may be prioritized for controlling service quality of data communications in a wireless network. A Quality of Service (QoS) control is provided by prioritizing transmission of the VoIP packets based on end-to-end delay on a downlink channel shared between at least two service users. The method comprises tracking an end-to-end delay that a first service user experiences for a service relative to a second service user, in transmission of voice over internet protocol packets, over a downlink channel shared between the first and second service users. The transmission of a plurality of voice over internet protocol packets may be prioritized for the first and second service users based on the end-to-end delay experienced by the first and second service users. Based on the larger end-to-end delay experienced by one user of a first mobile station than experienced by another user of a second mobile station, a priority adaptation may provide the QoS control for VoIP packets over a high-speed downlink packet access channel shared between the first and second mobile stations. For example, a scheduler at a base station communicating with the first and second mobile stations may provides such a QoS control for VoIP packets based on an end-to-end delay that a mobile-to-mobile user may be currently experiencing relative to a mobile-to-land user. In this way, the scheduler may maximize use of VoIP capacity while maintaining an acceptable level of end-to-end delay for different users of mobile stations in a communications system.

Figure 1:
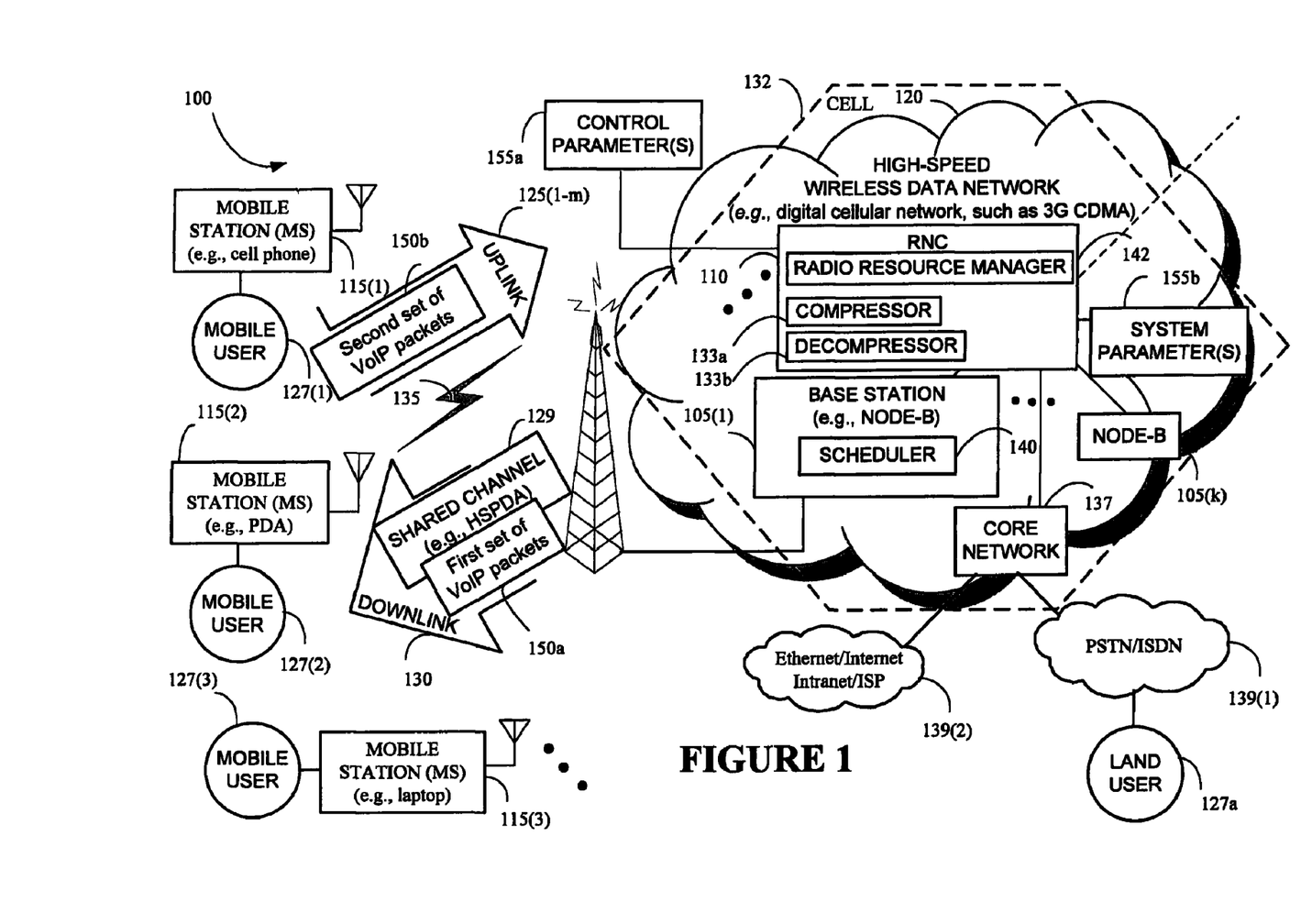
FIG. 1 schematically depicts a communications system, which includes first and second base stations that may provide quality of service control for voice over internet protocol packets on a downlink shared channel in a relatively high-speed wireless data network according to one illustrative embodiment of the present invention.

Referring to FIG. 1, a communications system 100 is illustrated to include first and second base stations (BSs) 105(1-k) that may provide quality of service (QoS) control for voice over internet protocol (VoIP) packets on a downlink shared channel 130 in a relatively high-speed wireless data network 120 in accordance with one illustrative embodiment of the instant invention. Specifically, each base station of the first and second base stations 105(1-k) may provide the wireless connectivity to a first, a second, and a third mobile station (MSs) 115(1-3) according to any desirable protocol, including a Code Division Multiple Access (CDMA, cdma2000) protocol, an Evolved Data Optimized (EVDO, 1XEVDO) protocol, a Universal Mobile Telecommunication System (UMTS) protocol, a Global System for Mobile communications (GSM) protocol, and like. The cdma2000 1xEV-DO specification uses the term "access network" for a base station, and "access terminal" for a mobile station, however, in the illustrated embodiment, the access network is shown as the base stations 105(1-k).

Examples of the first, second, and third mobile station 115(1-3) may include a host of wireless communication devices including, but not limited to, cellular telephones, personal digital assistants (PDAs), and global positioning systems (GPS) that employ the spread spectrum communications system 100 to operate in the high-speed wireless data network 120, such as a digital cellular CDMA network. Other examples of the first, second, and third mobile station 115(1-3) may include smart phones, text messaging devices, and the like.

In the spread spectrum wireless communications system 100, the high-speed wireless data network 120 may deploy any desirable protocol to enable wireless communications between the first and second base stations 105(1-k) and the first, second, and third mobile station 115(1-3) according to any desirable protocol. Examples of such a protocol include a (CDMA, cdma2000) protocol, an Evolved Data Optimized (EVDO, 1XEVDO) protocol, a UMTS protocol, a GSM protocol, and like.

A radio network controller (RNC) 110 may couple the first and second base stations 105(1-k) to enable first, second, and third mobile users 127(1-3) of the first, second, and third mobile station 115(1-3), respectively, and/or a land user 127a to communicate over the relatively high-speed wireless data network 120, such as a cellular network. One example of the high-speed wireless data network 120 includes a digital cellular network based on a CDMA protocol, such as specified by the 3rd Generation (3G) Partnership Project (3GPP) specifications.

Other examples of such a protocol include a 1xEV-DO protocol, a UMTS protocol, a GSM protocol, and like. The 3G cellular systems based on any one of these protocols, or the like, provide enhanced voice capacity and support high data rate packet based services. As one example, these features are provided in cdma2000 1xEV high rate packet data air interface referred to as IS-856. More specifically, the 3G cellular system cdma2000 1xEV provides high-speed wireless Internet access to users with asymmetric data traffic relative to a cellular network based on IS-95 standard. For example, data rate of the first user 127 (1) at the first mobile station 115(1) may very from 9.6 kbps to 153.6 kbps.

In operation, the radio network controller 110 may manage exchange wireless communications between the first, second, and third mobile stations 115(1-3) and the first and second base stations 105(1-k) according to one illustrative embodiment of the present invention. The first base station 105(1) may be assigned a plurality of channels within a frequency spectrum over which it can communicate with the first, second, and third mobile stations 115(1-3). A mobile station 115 among the first, second, and third mobile stations 115(1-3) within range of first base station 105(1) may communicate therewith using these channels.

Consistent with one embodiment, the first, second, and third mobile stations 115(1-3) may transmit messages to the first base station 105(1) and/or the second base station 105(k) over a plurality of uplinks 125(1-m). On a plurality of downlinks 130(1-k), the base stations 105(1-k) generally may communicate with the first, second, and third mobile stations 115(1-3) depending upon user geographic locations and/or available base station signal strengths and capacity to communicate.

For a wireless communication, from the first base station 105(1), a shared channel 129 on a first downlink 130(1) may provide messages to the first and second mobile stations 115(1), 115(k). The messages may include traffic packets and signaling messages. The cdma2000 1xEV-DO specification uses a frequency band with channel bandwidth (1.23 MHz) and chip rate (1.2288 Mcps). In cdma2000 1xEV-DO, for example, each downlink frame is 26.666 msec and consists of 16 slots. Like the downlink frame, the uplink frame is 26.666 msec and consists of 16 slots.

One example of the shared channel 129 is a channel based on High-speed Downlink Packet Access (HSDPA) protocol for a 3G or 3.5G or higher UMTS system that enhances downlink packet data rates for streaming and enable interactive and background services. Using, an adaptive modulation for a hybrid automatic repeat request (HARQ), the shared channel 129 may increase throughput, reduce delay and/or achieve high data rates to support services including video streaming, as set forth in 3GPP 25.308 specifications. For example, the high data rates may range from about 700 Kbit/s to 10 Mbit/s or even higher.

Likewise, using the HSDPA protocol, the shared channel 129 may provide relatively higher data rates in a cdma2000 1x Evolution for Data & Voice (1xEV-DV) system. The shared channel 129 may provide a packet-based data service in a wideband CDMA (W-CDMA) protocol based first downlink 130(1) with data transmission ranging from 8 Mbit/s to 20 Mbit/s over a 5 MHz bandwidth, as an example.

The radio network controller 110 may include a conventional compressor 133a and a conventional de-compressor 133b. For the first downlink 130(1), the compressor 133a at the radio network controller 110, for example, may pair with the de-compressor at the first mobile station 115(1). For example, the radio network controller 110 may maintain the synchronization between the compressor 133a and a de-compressor at the first mobile station 115(1) for VoIP packets during the soft handover.

In the communications system 100, wireless communications that communicate the messages between the first and second base stations 105(1-k) and the first, second, and third mobile stations 115(1-3) may occur over an air interface 135 via a radio frequency (RF) medium that uses a code division multiple access (CDMA) protocol to support multiple users. When moving within the high-speed wireless data network 120, such as a digital cellular CDMA network, a handover of wireless communications occurs for the first, second, and third mobile stations 115(1-3) upon a user leaving an area of responsibility of one cell to another cell. This handover may be coordinated by the radio network controller 110.

Each of the first and second base stations 105(1-k), sometimes referred to Node-Bs or Base Transceiver Stations (BTSs), may provide connectivity to associated geographical areas within the high-speed wireless data network 120. As shown in FIG. 1, the first and second base stations 105(1-k) may provide connectivity to the first, second, and third mobile stations 115(1-3) within an associated geographical area, sometimes referred to a cell 132.

Although one cell 132 is shown in FIG. 1, persons of ordinary skill in the pertinent art having benefit of the present disclosure should appreciate that the communication systems 100 may include a plurality of cells each of which transmits signals to and receives signals from the first, second, and third mobile stations 115(1-3) within its coverage or service area. For example, a coverage or service area of the high-speed wireless data network 120, such as a digital cellular network may be partitioned into connected service domains known as sectors of the cell 132.

Using the first mobile station 115(1), a cellular phone user, e.g., the first mobile user 127(1) may communicate, over the uplink 125(1), with the first base station 105(1) that serves the cell 132. The first base station 105(1), in turn, uses the first downlink 130(1) to reciprocate. While the cell 132 may be further partitioned into sectors, for example, three, the first base station 105(1) may be coupled to a wired network 133 through a core network 137. The core network 137 is generally responsible for providing a network backbone that carries traffic from different users of various wireless services.

The core network 137 may include a radio access network for call and message handling, as well as, voice and data switching and routing to provide call control and perform various telecom functions including mobility and security functions for location updating and authentication. The wired network 133 may comprise a first network 139(1) that includes a Public Switched Telephone Network (PSTN)/an Integrated Services Digital Network (ISDN) and a second network 139(2) that includes an Ethernet, Internet, Intranet, and Internet Service Providers (ISPs). However, persons of ordinary skill in the pertinent art should appreciate that the aforementioned types of networks are exemplary in nature and are not intended to limit the scope of the present invention.

According to one illustrative embodiment of the present invention, the first base station 105(1) may comprise a scheduler 140 that controls service quality of data communications in the high-speed wireless data network 120. The scheduler 140 may be suitably implemented in any number of ways using hardware, software, or a combination thereof to provide Quality of Service (QoS) control. The radio network controller 110 may comprise a manager 142 for radio resource management in the high-speed wireless data network 120. To enable the scheduler 140 to provide QoS control, the manager 142 may dynamically set a value for a transmission priority for Voice over Internet Protocol (VOIP) packets. The manager 142 may provide the value to the scheduler 140 that controls QoS control for the shared channel 129, such as a high-speed access channel.

In one embodiment, the scheduler 140 prioritizes transmission of a plurality of VoIP packets of at least two service users based on an end-to-end delay experienced by the two service users for a service in transmission of the plurality of VoIP packets over the shared channel 129 on the first downlink 130(1) in the high-speed wireless data network 120. The shared channel 129 may transmit the VoIP packets between the first and second mobile users 127(1-2) or the third mobile user 127(3) and the land user 127a for a VoIP service. One example of the VoIP service may be a service that is responsible for causing transmission of a plurality of VoIP packets for a service user. As used herein, the term "end-to-end delay" refers to the time taken by a VoIP packet to transmit across the high-speed wireless data network 120 either from the first mobile user 127(1) to the second mobile user 127(2) or from the third mobile user 127(3) and the land user 127a.

Based on the larger end-to-end delay experienced by the first mobile user 127(1) at the first mobile station 115(1) than experienced by the second mobile user 127(1) at the second mobile station 115(1), the scheduler 140 may adapt the transmission priority. In one embodiment, the scheduler 140 may provide the QoS control for VoIP packets over a high-speed downlink packet access channel shared between the first and second mobile stations.

For example, the scheduler 140 at the first base station 105(1), while communicating with the first and second mobile stations 115(1-2), may provide such a QoS control for VoIP packets based on an end-to-end delay that a connection between the first and second mobile users 127(1-2) may be currently experiencing relative to another connection between the third mobile user 127(3) and the land user 127a for the same VoIP service. In this way, the scheduler 140 may use the VoIP packet transmission capacity across the high-speed wireless data network 120 and still provide a desired level of end-to-end delay for different mobile users 127 at the mobile stations 115 in the communications system 100.

By increasing use of the VoIP capacity while maintaining an acceptable level of end-to-end delay in the communications system 100, for example, in the shared channel 129, such as a HSDPA channel based on a cdma2000 1xEV-DO or 1xEV-DV protocol based communications system, the scheduler 140 may reduce a scheduling delay for a service user. For example, the scheduling delay for when the first mobile user 115(1) experiences a relatively long end-to-end delay in the communications system 100, the scheduling delay at the scheduler 140 may be minimized. This reduction in the scheduling delay may enable the high-speed wireless data network 120 to satisfy a voice delay metric in transmission of the VoIP packets.

In one embodiment, minimizing the end-to-end delay may enable a spectrally efficient transfer of the VoIP packets over the HSDPA channel and a complementary HSDPA channel, such as a transport channel, e.g., an enhanced uplink dedicated channel (E-DCH) for packet oriented services including video-clips, multimedia, e-mail, telematics, gaming, video-streaming, and the like, in the communications system 100, such as a EV-DO or EV-DV communications system. This way, the scheduler 140 may manage the end-to-end delay of different VoIP users to maximize the communications system 100 capacity. More specifically, the communications system 100 may provide the scheduler 140 with information about the end-to-end delay that a particular VoIP user may be experiencing so that the scheduler 140 takes this delay information into account during prioritization.

However, in a VoIP over EV-DO or HSDPA/E-DCH system, the mobile users 127 may be assigned different priorities in the scheduler 140 to either improve or degrade the end-to-end delay experienced by each user. Since ideally the larger end-to-end delay may be associated with a connection for mobile-to-mobile users, such as the first and second mobile users 127(1-2), a delay variability associated with a packet channel may impact such users more when compared to mobile-to-land users, such as the third mobile user 127(3) and the land user 127a who typically have delay margin to burn.

In other words, as the number of users in the communication system 140 increases, the mobile-to-mobile users of a VoIP service may begin to experience less satisfactory end-to-end delay before the mobile-to-land users of a VoIP service do. Thus, the communication system 140 may cause the scheduler 140 to prioritize transmission of VoIP packets for the mobile-to-mobile users relative to the mobile-to-land users. More generally, the scheduler 140 may prioritize service users of a VoIP service that are currently experiencing larger end-to-end delays than other users experiencing smaller end-to-end delays.

By setting a service priority of a VoIP service having a service class based on the end-to-end delay that a first set of voice over internet protocol packets 150a associated with a mobile-to-mobile user connection between the first and second mobile users 115(1-2) are currently experiencing, the scheduler 140 may adaptively satisfy a desired voice delay criteria, such as the demanded delay requirement. The scheduler 140 schedules the VoIP service based on an individual user's radio channel condition, a system capability indication, a buffer status of the user and the service priority. While the status of a buffer may be associated with each of the mobile-to-mobile user connection and the mobile-to-land user connection, the system capability indication may be based on available radio resources.

In one embodiment, the service priority may allow the scheduler 140 to control each VoIP packet based on an associated priority to meet a quality of service (QoS) target for the VoIP service, such as QoS requirements of different services. Since the priority setting is primary for the QoS requirement of each service class, the priority may be individually set in each service class. For example, sixteen priorities defined in UMTS with four service classes defined and each service class having four priorities may me used. With the end-to-end delay based priority adaptation, the communications system 100 dynamically adjusts the service priority of the service class to enable the scheduler 140 to control VoIP packet scheduling in a manner that provides a desired QoS control of the VoIP over HSDPA-EDCH/EV-DV/EV-DO. For example, an increase in data rates within a 1.25 MHz carrier may provide relatively high rate data packet services to meet user demands of a high-speed web or e-mail access.

The scheduler 140 may schedule VoIP services based on the priority setting. To provide the QoS control, the scheduler 140 controls a set of control parameters 155a to meet the delay requirement for the VoIP service. By minimizing a scheduling delay for the first set of VoIP packets 150a, the scheduler 140 may satisfy the desired voice delay criteria at the air interface 135. To this end, the scheduler 140 may control the set of control parameters 155a based on the QoS target, meeting the desired voice delay criteria for the VoIP service when scheduling the first set of VoIP packets 150a.

According to one illustrative embodiment of the present invention, the set of control parameters 155a at the scheduler 140 may include a scheduling order parameter that the scheduler 140 may change to set the QoS target of the first set of VoIP packets 150a to a higher priority than a second set of VoIP packets 150a associated with a mobile-to-land user connection between the third mobile user 127(3) and the land user 127a to obtain a scheduling order that reduces a queuing delay.

In one embodiment, the scheduling order parameter may indicate that the order of the transmission for a multiple user contention based high-speed shared access channel may have a variable delay. A change of the priority changes the scheduling order of the transmission in the downlink 130 to enable variation of a queuing delay of the first set of VoIP packets 150a over the shared channel 129, such as a high-speed packet access channel through the air interface 135. The QoS control of the VoIP, for example, the first set of VoIP packets 150a sets a higher priority to obtain an early scheduling that reduces the queuing delay.

Consistent with one embodiment, the set of control parameters 155a may further include a power level parameter or traffic to pilot (TP) ratio parameter that the scheduler 140 may dynamically adjust to adjust a VoIP delay at the air interface 135. For example, the power level parameter or traffic to pilot (TP) ratio parameter enables a dynamic adjustment of the power level of the VoIP packets, such as the first set of the VoIP packets 150a in a Hybrid ARQ (HARQ) process at the air interface 135. A different power level of traffic to pilot (TP) ratio for any specific packet size indicates a different probability of successful transmission in a HARQ process. That is, the higher the power, the higher the probability of successful transmission and the fewer the retransmission in a HARQ process, which leads to smaller average delay.

In addition to the power level parameter, the set of control parameters 155a may comprise a subsequent power level parameter of each sub-packet of a hybrid automatic repeat request (HARQ) process. The scheduler 140 may adjust the subsequent power level parameter of each sub-packet based on power distribution of the each sub-packet in the HARQ process. In response to adjusting the subsequent power level parameter, the scheduler 140 controls a HARQ delay for the VoIP service.

For example, using the subsequent power level of a sub-packet in a HARQ process, the scheduler 140 may adjust the subsequent power level of each sub-packet of the HARQ process. An adjustment of the sub-packet power may change an early termination gain and an associated relative delay due to the HARQ process. If the HARQ process targets to terminate at the fourth transmission with a frame error rate at 1%, in that case, a non-uniform power distribution of each sub-packet of the HARQ process may vary the early termination gain. If the power distributed is relatively more in the first few packets, then the average termination gain is smaller and the average delay due to HARQ process is smaller. Use of the power distribution of the sub-packet, in a HARQ process, enables control of the HARQ delay for the VoIP service.

Consistent with one embodiment, in the communication system 100 adaptive priority setting may be provided for a distributed control that allows the radio resource manager 142 to dynamically set a priority for the first and second mobile users 127(1-2). To provide QoS control for the shared channel 129, a value of the priority may be passed to the scheduler 140.

As one example, the adaptive priority setting may enable the scheduler 140 to adapt a priority level for a VoIP service based on a referential system parameter and a delay measurement within a provision interval. For the shared channel 129, such as a high-speed access channel, the scheduler 140 may dynamically adjust a system parameter to accommodate a VoIP delay requirement of the air interface 135 based on the priority setting of each packet. In this way, the adaptive priority setting may enable a flexible resource arrangement and a tight control, substantially increasing the radio resource utilization and QoS control. For example, when the priority sets at a lower priority level, the scheduler 140 may divert at least one radio resource to other mobile or land users with a higher level of demand depending upon whether an outcome of a referential measure allows a relatively longer interface delay for the specific VoIP user.

The adaptive priority setting may include setting the priority based on a set of provisioned system parameters 155b including, a system performance statistic and a type of VoIP user during a call setup period. The system parameters 155b may comprise one or more parameters, for the radio resource manager 142 at the RNC 110, which include a parameter indicative of the number of VoIP users, and the number of users in each service class. Each service class may be characterized by an associated traffic characteristic.

However, different combination of service classes may result in different average scheduling delay for the desired VoIP service. Thus, the priority setting may be different for each combination. For example, an initial priority setting may be k out of a total number of K with priority K being the highest priority if all users use VoIP services. The initial priority setting may be k+1 in response to one or more high data rate data users, for example the first mobile user 127(1), in a mix since a high data rate user may consume a significantly more capacity of the air interface 135, causing a relatively higher delay to other VoIP service users, such as the second, third mobile users 127(2-3) and the land user 127a.

A desired set of parameters may be provisioned in the system parameters 155b to include a system performance statistic, which includes a system loading and a system overload status for the communications system 100. The system load may provide a first reference of the average delay for a VoIP service user, such as the first, second, third mobile users 127(2-3) and the land user 127a. If the system load is low, the initial priority setting may be set lower since the expected mean delay may be low as a result. However, upon becoming overloaded, the communications system 100 may initiate throttling the traffic, causing an increase in the average delay of the VoIP service user. Thus, the initial priority setting for the VoIP service users may be set at a relatively higher level in some embodiments of the present invention.

The provisioned set of the system parameters 155b may further include a VoIP call type, such as a mobile-to-mobile call, a mobile-to-land call, a land-to-mobile call, a call with transcoding, a call with multiple transcoding, and an end-to-end call without transcoding. If the call type is known in the call setup, the initial priority setting may be set accordingly. For example, the initial priority for the mobile-to-mobile call may be set to k+1 if the initial priority for the mobile-to-land call is set to k. In another example of a call with transcoding, the initial priority may be set higher than the initial priority of a call without transcoding since the transcoding delay may be significantly high. The call type with or without transcoding may be known at the call setup.

In addition to the VoIP call type, the set of provisioned system parameters 155b further include a priority adjustment by a reference measurement. After the initial priority setting for the specific VoIP user, the priority needs to be adjusted adaptively based on the delay measurement results. Besides the priority adjustment by a reference measurement, the set of provisioned system parameters 155b may further include a priority reset. The priority may be reset at a higher level when synchronization is lost between the uplink 125(1) and the downlink 130. The exaggerate packet loss and error may cause the loss of the synchronization to trigger the re-synchronization procedure of the uplink 125(1). With such a radio condition, in one embodiment, the priority may be set at the highest level K when the uplink 125(1) enters into an out-of-sync state.

In this manner, the adaptive priority setting of a service user, such as a mobile or a land user 127 may enable the scheduler 140 to manage the delay, e.g., the end-to-end delay experienced by different service users including the first, second, third mobile users 127(2-3) and the land user 127a. The scheduler 140 may manage such the end-to-end delay based on a scheduling order and a radio resource assignment to meet the QoS requirements for all users and in particular VoIP service users. By dynamically setting the priority, the adaptive priority setting not only adjusts the priority of a VoIP service user to a higher level, accommodating the larger measured delay while lowering the priority when the delay is not excessive.

As set forth above, the priority adaptation enables the communications system 100 to prioritize users in the scheduler 140 when the associated end-to-end delay becomes excessive (e.g., for mobile-to-mobile users near a cell edge of the cell 132) by de-prioritizing users with a delay margin to burn (e.g., mobile-to-land users or users close to the cell 132). Accordingly, the communications system 100 may maximize the VoIP capacity while still maintaining an acceptable level of the end-to-end delay for all users, in one illustrative embodiment of the present invention.

However, persons of ordinary skill in the art having benefit of the present disclosure should appreciate that the present invention is not limited to, the control parameters 155a and the system parameters 155b. In alternative embodiments, the scheduler 140 may enable the scheduler to provide different capabilities and/or additional capabilities for controlling the service quality of the VoIP packets on the downlink 130 in transmission of high-speed data in the shared channel 129, which may be a HSPDA channel.

According to one embodiment, the first mobile station 115(1) may transmit messages or signals to one or more active base stations using one or more associated uplinks. The first mobile station 115(1) may receive messages and/or signals over the downlink 130 between the first mobile station 115(1) and one of the active base stations. Besides the messages or signals, the first mobile station 115(1) may receive voice packets, such as VoIP packets. Often the VoIP packets include information that is intended for the user of the first mobile station 115(1). For example, VoIP packets may include voice information, images, video, data requested from an Internet site, and the like. In contrast, signaling messages are used to provide information intended to be used by the first mobile station 115(1) and/or other elements of the spread spectrum wireless communications system 100. Specifically, signaling messages may include configuration messages, setup instructions, switch instructions, handoff instructions, and the like.

According to one illustrative embodiment, the uplinks 125 (1-m) and the downlink 130 may be established on a plurality of channels. The channels, such as traffic and control channels may be associated with separate channel frequencies. For example, these channels with associated channel number and frequency may form a wireless communication link for transmission of the first and second sets of VoIP packets 150a, 150b. In the downlink 130, for example, the first mobile station 115(1) may update the first base station 105(1) with a data rate to receive transmissions on a Forward Traffic Channel or a Forward Control Channel.

In the uplink 125(1), the first mobile station 115(1) may transmit on an Access Channel or a Traffic Channel. The Access Channel may include a Pilot Channel and a Data Channel. The Traffic Channel includes Pilot, MAC and Data Channels. The MAC Channel comprises three sub-channels including a Reverse Rate Indicator (RRI) sub-channel that is used to indicate whether the Data Channel is being transmitted on the Reverse Traffic Channel and the data rate. Another sub-channel is a Data Rate Control (DRC) that is used by the first mobile station 115(1) to indicate to the first base station 105(1) a data rate that the Forward Traffic Channel may support and the best serving sector. An acknowledgement (ACK) sub-channel is used by the first mobile station 115(1) to inform the first base station 105(1) whether the data packet transmitted on the Forward Traffic Channel has been received successfully.

Although two base stations 105(1-k) and one radio network controller 110 are shown in FIG. 1, persons of ordinary skill in the pertinent art having benefit of the present disclosure should appreciate that any desirable number of base stations 105 and radio network controllers 110 may be used. Likewise, the high-speed wireless data network 120 is shown to include the first and second base stations 105(1-k) coupled to the radio network controller 110 in FIG. 1, persons of ordinary skill in the art should appreciate that portions of the high-speed wireless data network 120 may be suitably implemented in any number of ways to include other components using hardware, software, or a combination thereof High-speed wireless data networks are known to persons of ordinary skill in the art and so, in the interest of clarity, only those aspects of the high-speed wireless data network 120 that are relevant to the present invention will be described herein.

Figure 2:
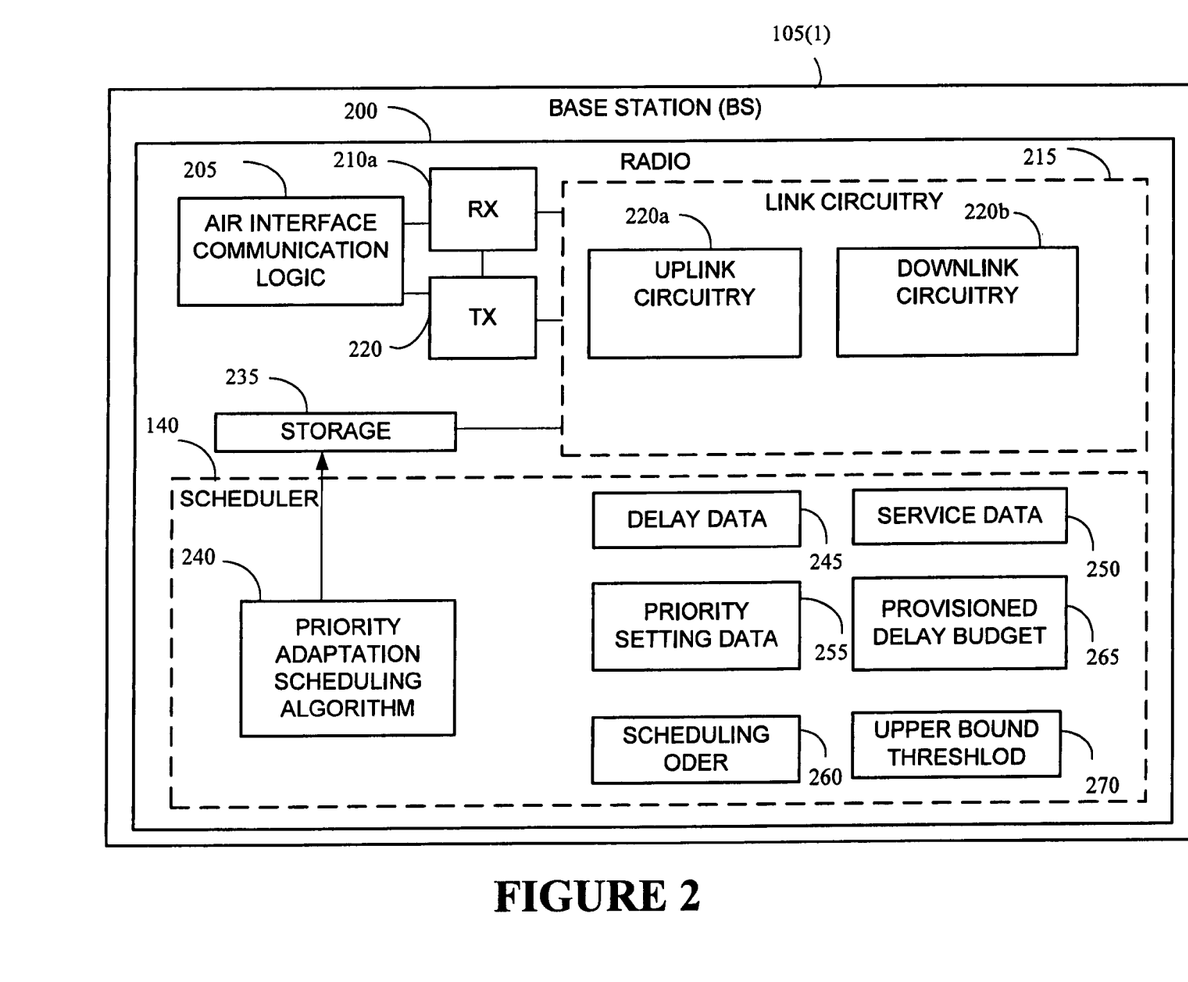
FIG. 2 schematically depicts the first base station to include the scheduler shown in FIG. 1 for providing quality of service control for voice over internet protocol packets on a downlink shared channel in accordance with one illustrative embodiment of the present invention.

Referring to FIG. 2, the first base station 105(1) is depicted to include the scheduler 140 shown in FIG. 1 for providing quality of service control for VoIP packets on the downlink 130 over the shared channel 129 in accordance with one illustrative embodiment of the present invention. To enable wireless communication links including the downlink 130 to the first mobile station 115(1) and the uplink 125(1) therefrom, the first base station 105(1) comprises a radio 200 that includes an air interface communication logic 205 coupled to a receiver (RX) 210a and a transmitter (TX) 210b.

Consistent with one embodiment, the radio 200 further comprises link circuitry 215 that enables the first base station 105(1) to form the downlink 130 and the uplink 125(1). More specifically, to enable wireless communications with the first mobile station 115(1), the link circuitry 215 may comprise uplink circuitry 220a. Likewise, to communicate with the first, second, and third mobile stations over the downlink 130 using the shared channel 129, the first base station 105(1) may comprise downlink circuitry 220b.

The radio 200 may further comprise a storage 235 coupled to the scheduler 140 to store an algorithm 240 at the first base station 105(1), in one embodiment. The algorithm 240 may be responsible for scheduling VoIP packets based on priority adaptation of the first, second, third mobile users 127(1-3) and the land user 127a. Using the algorithm 240, the scheduler 140 may control the scheduling of the first set of VoIP packets for providing control over a QoS target in response to dynamic adjusting of the service priority.

To this end, in one embodiment, the algorithm 240 of the scheduler 140 may use delay data 245, service data 250, priority setting data 255, a scheduling order 260, a provisioned delay budget 265, and an upper bound threshold(s) 270. The algorithm 240 may enable the scheduler 140 to set a service priority of the VoIP packet service having a service class based on the end-to-end delay that the first set of VoIP packets 150a associated with the mobile-to-mobile user, e.g., the mobile users 127(1-2) are currently experiencing to adaptively satisfy a desired voice delay criteria.

In one embodiment, based on a radio channel condition and a status of a buffer associated with each of the mobile-to-mobile and mobile-to-land users, a system capability indication, and the service priority, the algorithm 240 may cause the scheduler 140 to schedule the VoIP service. To meet the QoS target for the VoIP packet service, the algorithm 240 may cause the scheduler 140 to control the first set of VoIP packets 150a based on the service priority. In this manner, for satisfying the desired voice delay criteria at the air interface 135, the algorithm 240 may cause the scheduler 140 to minimize a scheduling delay for the first set of VoIP packets 150a.

To dynamically adjust an initial priority level, the algorithm 240 may obtain the measure of the delay from the compressor 133a at the RNC 110 or the CN 137 over the downlink 130 on the shared channel 129. For example, an internet protocol header compressor may be used for a VoIP packet. Based on the measured delay, the algorithm 240 may adaptively adjust the initial priority level for a specific VoIP user, such as the first mobile user 127(1).

In the measured delay, however, if an average delay exceeds the upper bound threshold(s) 270 of the provisioned delay budget 265, the algorithm 240 may set a priority level to be at least one level higher than the initial priority level. The algorithm 240 may use a multiplicity of the upper bound threshold(s) 27) for the provisioned delay budget 265 to enable a multiple step size adjustments of the priority level, accommodating the larger delay variation. However, in the measured delay, if a mean delay falls below the upper bound threshold(s) 270, the algorithm 240 may lower the priority level, enabling one or more VoIP service users different than the specific VoIP service user to be scheduled earlier for reducing the delay.

For some reason, if synchronization is lost between the compressor and the decompressor, such as an internet protocol header de-compressor, the algorithm 240 may reset the priority level to a relatively higher level. The algorithm 240 may use the adaptive priority setting to enable the scheduler 140 to manage a delay experienced by different VoIP service users through the scheduling order 260 and a radio resource assignment so that the scheduler 140 may meet a QoS requirement for all users of a plurality of VoIP service users.

By dynamically adjusting a priority level to a relatively higher level, the algorithm 240 may accommodate a measured delay that is larger than a delay experienced by a service user among the first and second service users, e.g., the first and second mobile users 127(1-2), in some embodiments. The algorithm 240 may perform dynamic adjustment of the priority level to a relatively lower level when the measured delay is relatively smaller than a delay experienced by a service user among the first and second service users, e.g., the first and second mobile users 127(1-2), in some embodiments.

The algorithm 240 may enable the scheduler 140 to prioritize the mobile-to-mobile user or a user near a cell edge when the end-to-end delay becomes larger than a delay experienced by the mobile-to-land user or a user close to the cell 132. To this end, the algorithm 240 may de-prioritize the mobile-to-land user or the mobile user 127 close to the cell 130 with a delay margin to spare. In this way, the algorithm 240 may enable the scheduler 140 to maximize VoIP capacity over the downlink 130 on the shared channel 129 in the high-speed wireless data network 120 while maintaining an acceptable level of end-to-end delay for all users including the mobile-to-mobile user or the user near the cell edge and the mobile-to-land user or the user close to the cell 132.

Figure 3:
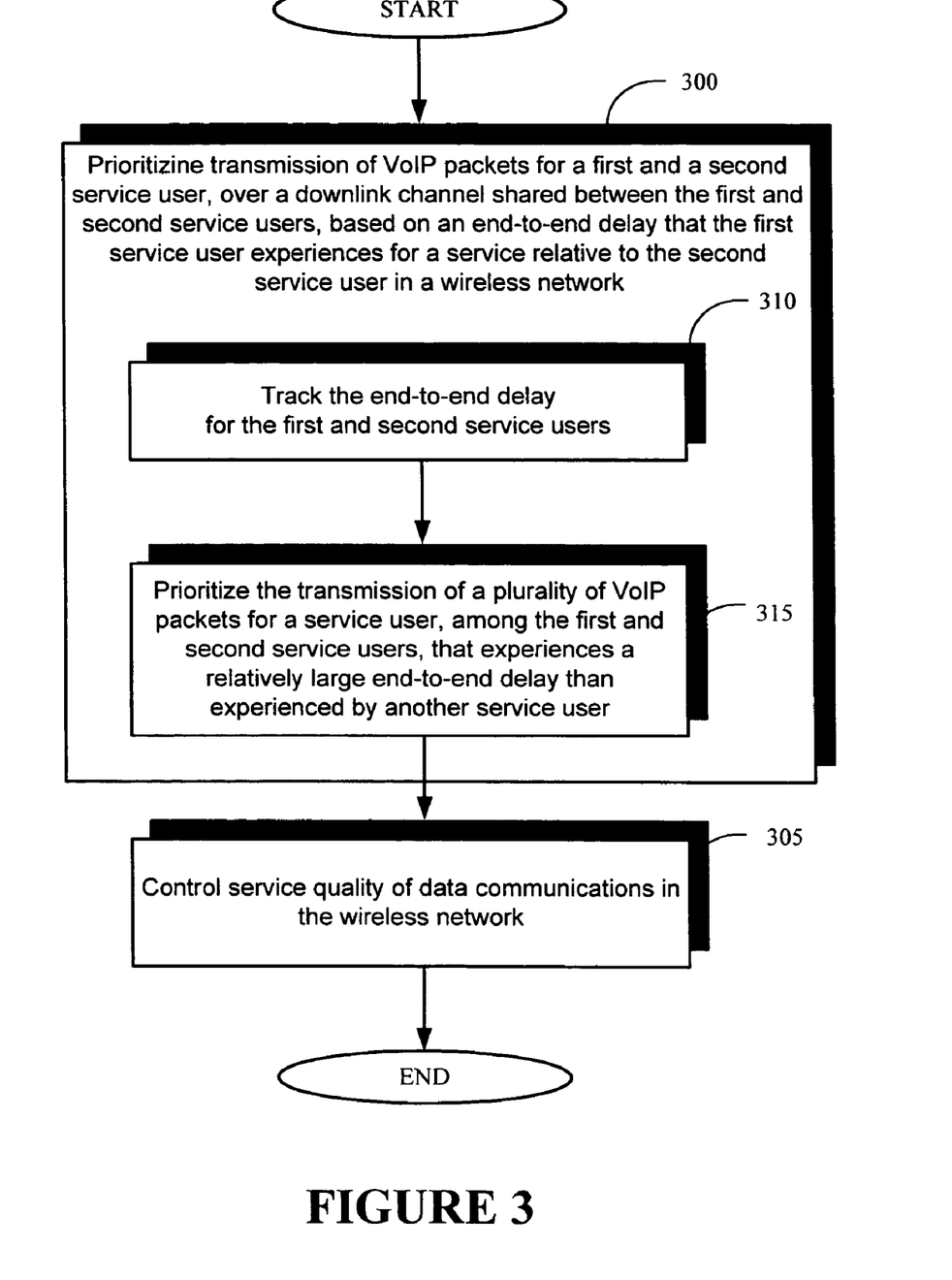
FIG. 3 depicts a stylized representation for implementing a method of providing quality of service control for voice over internet protocol packets on a downlink shared channel at the first base station in the communications system shown in FIG. 1 consistent with an exemplary embodiment of the present invention.

Turning now to FIG. 3, a stylized representation is illustrated for implementing a method of providing QoS control for VoIP packets over the downlink 130 on the shared channel 129 at the first base station 105(1) in the communications system 100, as shown in FIG. 1, according to one embodiment of the present invention. Based on an end-to-end delay that the first mobile user 127(1) experiences for a service, such as a VoIP service relative to the third mobile user 127(3), in the high-speed wireless data network 120, the scheduler 140 may prioritize transmission of VoIP packets for the first and second service users, e.g., the first and third mobile users 127(1, 3), over the downlink 130 on the shared channel 129 therebetween, as shown in block 300. At block 305, the scheduler 140, to provide a desired QoS control for VoIP packets controls service quality of data communications of the first and third mobile users 127(1, 3)in the high-speed wireless data network 120 based on the end-to end delay.

To prioritize transmission of VoIP packets, the scheduler 140 may estimate the end-to-end delay for the first and second service users, e.g., the first and third mobile users 127(1, 3), as shown in block 310. At block 315, the scheduler 140 may prioritize the transmission of a plurality of VoIP packets for a service user, such as a mobile user among the first and third mobile users 127(1, 3), that experiences the larger end-to-end delay than experienced by another service user. In this way, the scheduler 140 provides the QoS control for VoIP packets over the downlink 130 on the shared channel 129.

Figure 4:
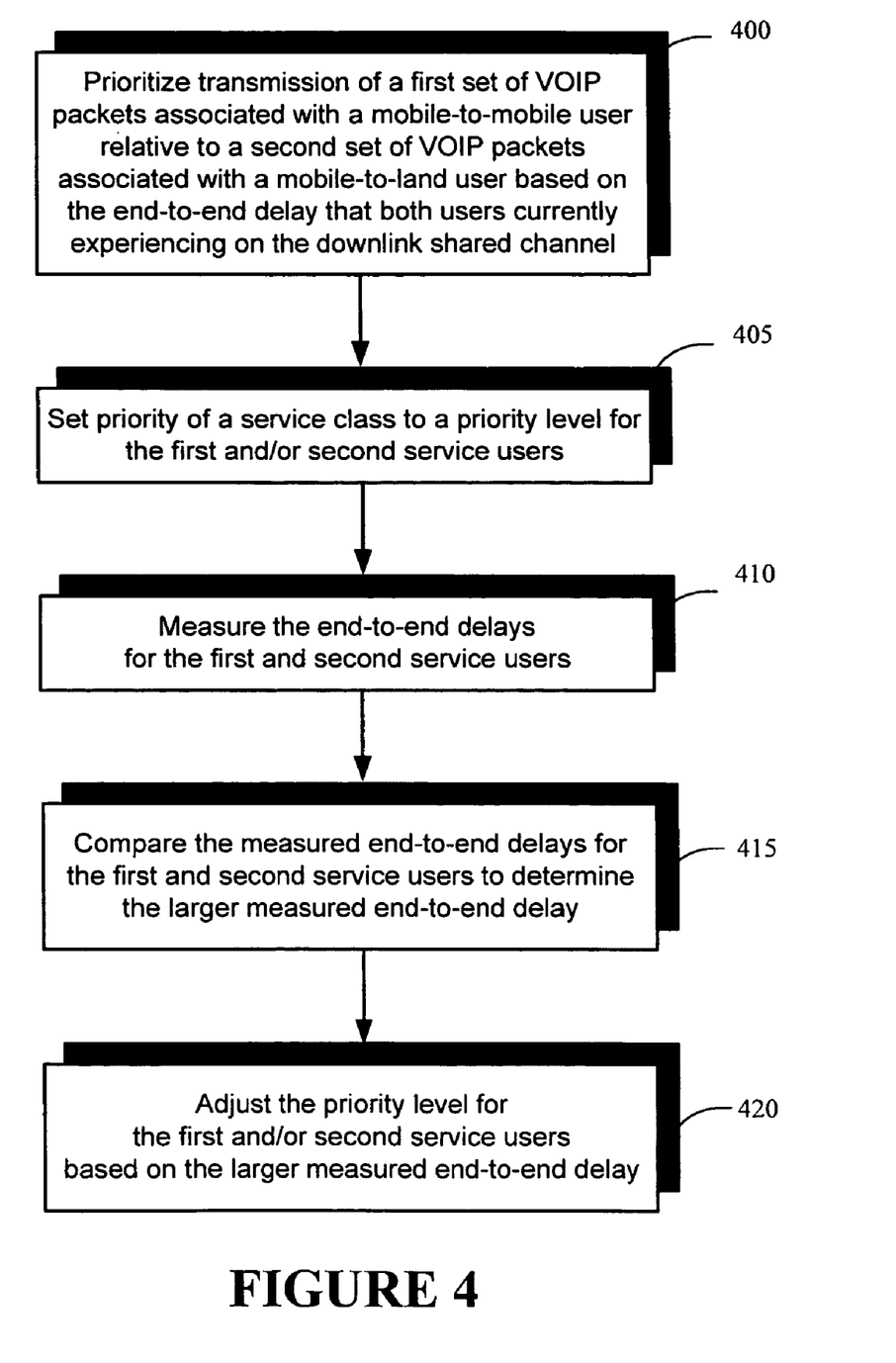
FIG. 4 illustrates a stylized representation for implementing a method of prioritizing transmission of voice over internet protocol packets in the communications system shown in FIG. 1, according to one embodiment of the present invention.

Referring to FIG. 4, a stylized representation of one exemplary embodiment of the instant invention is illustrated for implementing a method of prioritizing transmission of voice over internet protocol packets in the communications system 100. At block 400, the scheduler 140 may prioritize the transmission of a plurality of VoIP packets for a mobile-to-mobile user call over a mobile-to-land user call based on the end-to-end delay that a mobile-to-mobile user and a mobile-to-land user currently experiencing on the shared channel 129, such as a high-speed downlink packet access (HSDPA) channel. For the purposes of prioritizing the transmission of the VoIP packets for first and second service users, such as the first and the third mobile users 127(1, 3), the scheduler 140 may set priority of a service class to a priority level for at least one of the first and third mobile users 127(1, 3), as indicated at block 405.

At block 410, the scheduler 140 may measure the end-to-end delay for the first and third mobile users 127(1, 3). To determine the larger measured end-to-end delay, the scheduler 140 may compare the measured end-to-end delays for the first and third mobile users 127(1, 3), at block 415. The scheduler 140, in block 420, may adjust the priority level for the first and/or third mobile users 127(1, 3) based on the larger measured end-to-end delay.

Figure 5:
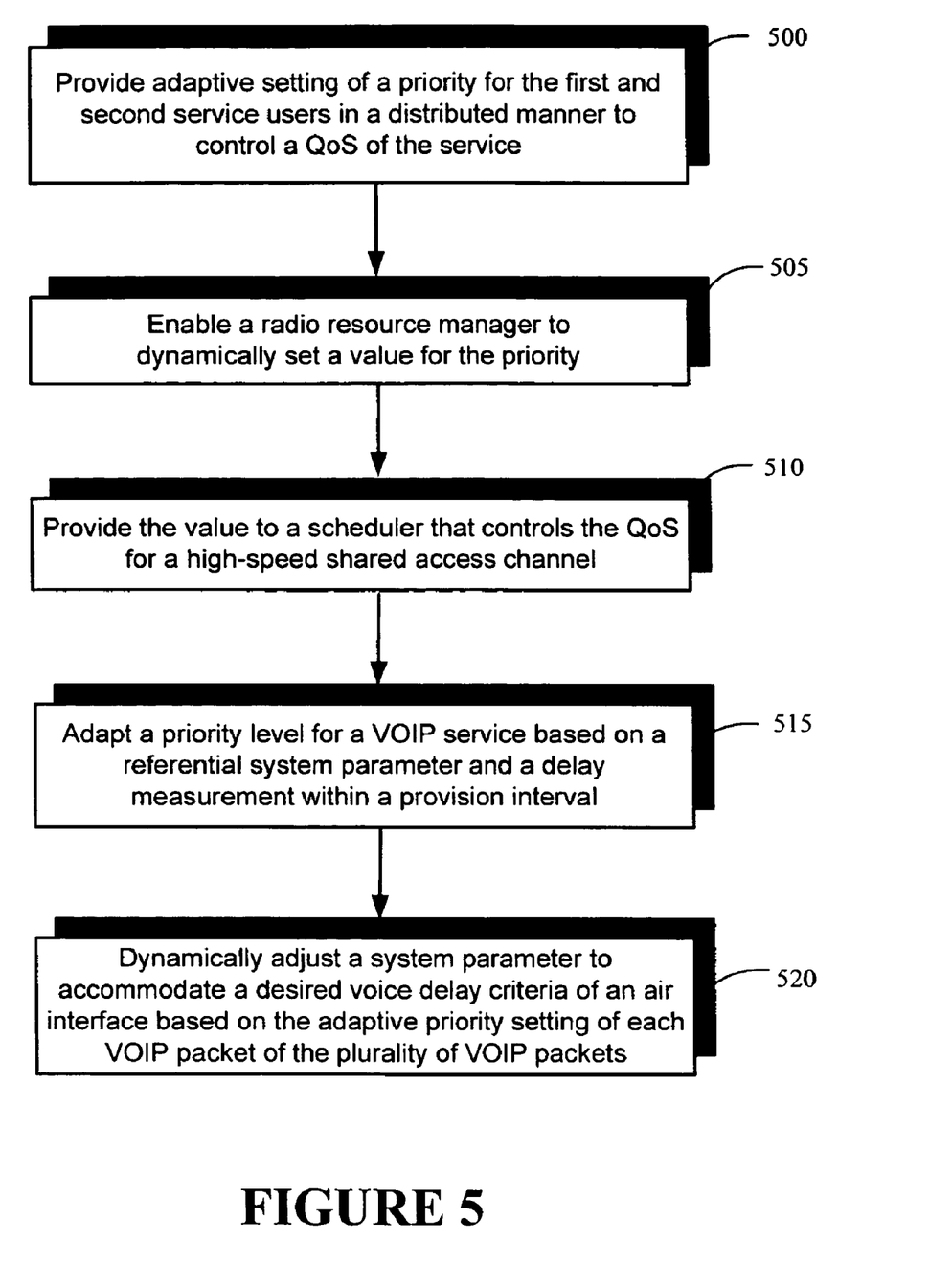
FIG. 5 illustrates a stylized representation for implementing a method of providing adaptive priority setting to dynamically adjust the transmission of voice over internet protocol packets at the first base station shown in FIG. 2 according to one illustrative embodiment of the present invention.

As shown, FIG. 5 illustrates a stylized representation of an exemplary embodiment of the instant invention for implementing a method of providing adaptive priority setting to dynamically adjust the transmission of VoIP packets at the first base station 105(1) shown in FIG. 2. At block 500, to control service quality of data communications in the shared channel 129 over the downlink 130, the scheduler 140 may provide adaptive setting of a priority for the first and/or third mobile users 127(1, 3) in a distributed manner to control a QoS of a service, such as a VoIP service. The scheduler 140 may enable the radio resource manager 142 to dynamically set a value for the priority, as set forth in block 505. By providing the value to the scheduler 140, the QoS for the shared channel 129, such as a high-speed access channel may be controlled, at block 510.

Based on a referential system parameter and a delay measurement within a provision interval, the scheduler 140 may adapt a priority level for a VoIP packet service, as shown in block 515. More specifically, the scheduler 140 may dynamically adjust a system parameter to accommodate a desired voice delay criteria of the air interface 135 based on the adaptive priority setting of each VoIP packet of the plurality of VoIP packets, at block 520.

Figure 6:
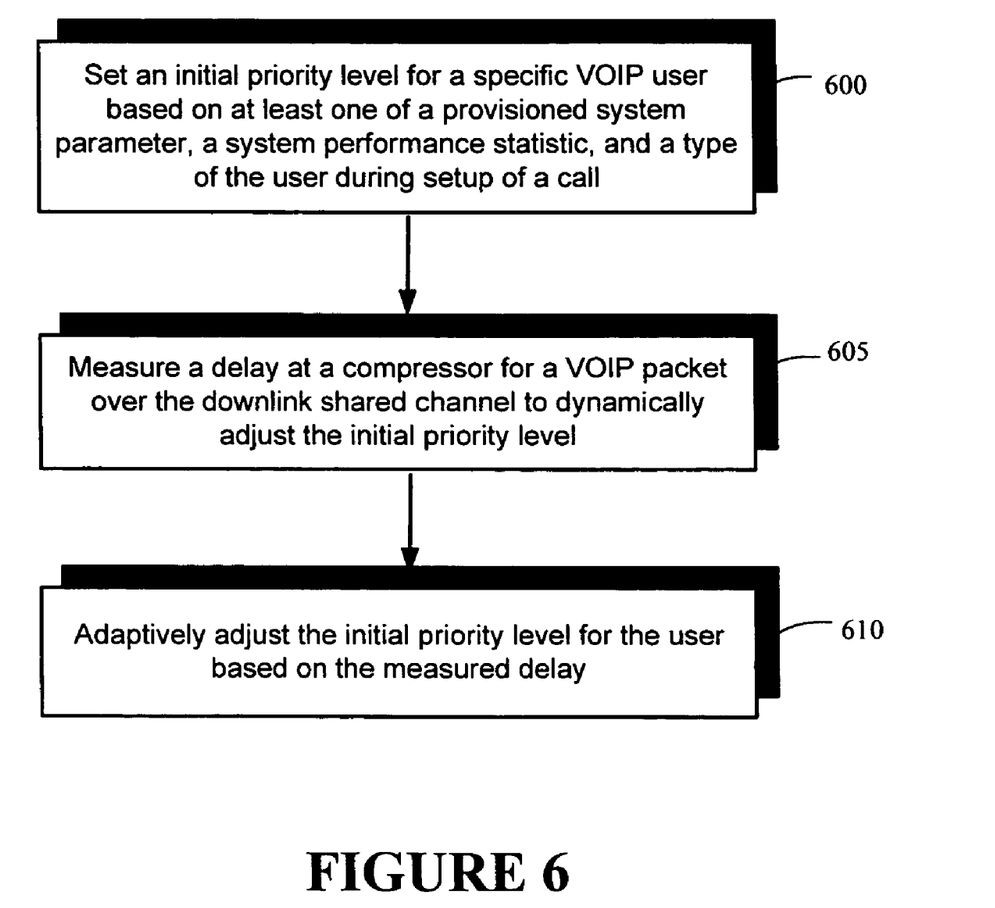
FIG. 6 illustrates a stylized representation for implementing a method of priority setting to dynamically adjust the transmission of voice over internet protocol packets at the first base station shown in FIG. 2 according to one illustrative embodiment of the present invention.

FIG. 6 illustrates a stylized representation for implementing a method of priority setting to dynamically adjust the transmission of VoIP packets at the first base station 105(1) shown in FIG. 2 according to one illustrative embodiment of the present invention. At block 600, the scheduler 140 may set an initial priority level for a specific VoIP user, such as the first mobile user 127(1) based on at least one of a provisioned system parameter, a system performance statistic, and a type of the specific VoIP user during setup of a call. As indicated at block 605, the scheduler 140 may obtain the delay measure from the compressor 133a for a VoIP packet over the downlink 130 in the shared channel 129 to dynamically adjust the initial priority level. The scheduler 140 may adaptively adjust the initial priority level for that specific VoIP user based on the measured delay, in block 610.

For example, a Real-Time Transport Protocol (RTP) protocol and a Robust Header Compression (ROHC) of RTP/User Datagram Protocol (UDP)/Internet protocol (IP) for VoIP may provide the scheduler 140 the reference measure of the absolute delay and delay jitter. The scheduler 140 may perform a dynamic priority adjustment by obtaining the delay at the compressor 133a based on the RoHC for a VoIP packet transmitted on the downlink 130. To this end, the average of measurement in a predefined period w may be used as the reference measure. If the average delay exceeds the upper bound threshold(s) 270 of the provisioned delay budget 265, the priority may be set at least one step higher than a current priority. Likewise, the priority may be lowered when the mean delay falls below the upper bound threshold(s) 270. In this way, the scheduler 140 may enable other VoIP service users than the specific VoIP user to be scheduled earlier for a desired delay reduction in some embodiments of the instant application.

However, the priority may be reset at a higher level when synchronization is lost between the RoHC based compressor 133a at the RNC 110 or the CN 137 and the decompressor at the first mobile station 115(1). For example, an exaggerate packet loss and an error may cause the loss of the synchronization to trigger a re-synchronization routine of the RoHC based compressor 133a. With a vulnerable radio condition, in one embodiment, the scheduler 140 may desirably sets the priority at the highest level K when RoHC is out-of-sync.

In one embodiment, the high-speed wireless data network 120 may wirelessly communicate mobile data at a speed and coverage desired by individual users or enterprises. According to one embodiment, the high-speed wireless data network 120 may comprise one or more data networks, such as Internet Protocol (IP) network comprising the Internet and a public telephone system (PSTN). The 3rd generation (3G) mobile communication system, namely Universal Mobile Telecommunication System (UMTS) supports multimedia services according to 3rd Generation Partnership Project (3GPP) specifications. The UMTS adapts the Wideband Code Division Multiple Access (WCDMA) technology and includes Core Networks (CN) that are packet switched networks, e.g., IP-based networks. Because of the merging of Internet and mobile applications, the UMTS users can access both telecommunications and Internet resources. To provide an end-to-end service to users, a UMTS network may deploy a UMTS bearer service layered architecture specified by Third Generation Project Partnership (3GPP) standard. The provision of the end-to-end service is conveyed over several networks and realized by the interaction of the protocol layers.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method for a wireless communications between at least a first and a second service user, the method comprising:
    prioritizing transmission of voice over internet protocol packets for the first and second service users over a shared downlink channel based on a first measured value of a first end-to-end delay that the first service user experiences relative to a second measured value of a second end-to-end delay that the second service user experiences, wherein the first end-to-end delay and the second end-to-end delay are obtained at an internet protocol header compressor that compresses the voice over internet protocol packets, and wherein the measurements are obtained based on headers attached to the voice over internet protocol packets by the compressor, wherein the first service user is a mobile-to-mobile user and the second service user is a mobile-to-land user, and wherein prioritizing transmission of voice over internet protocol packets comprises de-prioritizing the mobile-to-land user relative to the mobile-to-mobile user.

2. A method, as set forth in claim 1, wherein prioritizing transmission of voice over internet protocol packets further comprises:
tracking said first and second measured values of said first and second end-to-end delays; and
prioritizing the transmission of a plurality of voice over internet protocol packets for at least one of the service users experiencing an end-to-end delay larger than experienced by another service user for a service.

3. A method, as set forth in claim 1, wherein prioritizing transmission of voice over internet protocol packets further comprises:
prioritizing the transmission of a plurality of voice over internet protocol packets for the first service user over the second service user, wherein the first service user is a mobile-to-mobile wireless service user and the second service user is a mobile-to-land wireless service user, based on first and second measured values of said first and second end-to-end delays that said mobile-to-mobile wireless service user and said mobile-to-land wireless service user experience, respectively, on a high-speed downlink packet access channel.

4. A method, as set forth in claim 1, wherein prioritizing transmission of voice over internet protocol packets for the first and second service users further comprises:
setting priority of a service class to a priority level for at least one of the service users;
measuring said first and second measured values of said first and second end-to-end delays;
comparing said first and second measured values of said first and second end-to-end delays to determine the larger measured end-to-end delay; and
adjusting said priority level for said at least one of the service users based on the larger of said first and second measured values.

5. A method, as set forth in claim 4, wherein adjusting said priority level for the at least one of the service users further comprises:
comparing said first and second measured values of said first and second end-to-end delays for each of said first and second service users to a delay threshold;
if at least one of said first and second measured values of said first and second end-to-end delays for a service user of at least one of the service users exceeds said delay threshold, prioritizing said service user of at least one of the service users in a scheduler; and
if at least one of said first and second measured values of said first and second end-to-end delays for said service user of at least one of the service users indicates a delay margin to reach said delay threshold, de-prioritizing said service user of at least one of the service users in said scheduler.

6. A method, as set forth in claim 3, further comprising:
dynamically adjusting a service priority for said voice over internet protocol packet service based on at least one of said first and second measured values of said first and second end-to-end delays; and
controlling the scheduling of said first set of voice over internet protocol packets for providing control over said quality of service target in response to dynamically adjusting said service priority.

7. A method, as set forth in claim 6, further comprising:
setting said service priority of said voice over internet protocol packet service having a service class based on said first measured value of said first end-to-end delay that a first set of voice over internet protocol packets associated with said mobile-to-mobile wireless service user are currently experiencing to adaptively satisfy a desired voice delay criteria;
scheduling said voice over internet protocol packet service based on a radio channel condition and a status of a buffer associated with each of said mobile-to-mobile and mobile-to-land wireless service users, a system capability indication, and said service priority;
controlling said first set of voice over internet protocol packets based on said service priority to meet a quality of service target for said voice over internet protocol packet service; and
minimizing a scheduling delay for said first set of voice over internet protocol packets to satisfy said desired voice delay criteria at an air interface.

8. A method, as set forth in claim 6, further comprising:
controlling a set of parameters based on said quality of service target to meet said desired voice delay criteria for said voice over internet protocol packet service when scheduling said first set of voice over internet protocol packets.

9. A method, as set forth in claim 8, wherein controlling a set of parameters further comprises:
changing a scheduling order parameter to set said quality of service target of said first set of voice over internet protocol packets to a higher priority than said second set of voice over internet protocol packets of said mobile-to-land wireless service user to obtain a scheduling order that reduces a queuing delay.

10. A method, as set forth in claim 8, wherein controlling a set of parameters further comprises:
dynamically adjusting a power level parameter of traffic to pilot ratio to adjust a voice over internet protocol packet delay at an air interface.

11. A method, as set forth in claim 8, wherein controlling a set of parameters further comprises:
adjusting a subsequent power level parameter of each sub-packet of a hybrid automatic repeat request process based on power distribution of said each sub-packet in said hybrid automatic repeat request process; and
controlling a hybrid automatic repeat request delay for said voice over internet protocol packet service in response to adjusting said subsequent power level parameter.

12. A method, as set forth in claim 1, further comprising:
providing adaptive setting of a priority for the first and second service users in a distributed manner to control a quality of service of said service;
enabling a radio resource manager to dynamically set a value for said priority; and
providing said value to a scheduler that controls said quality of service for a high-speed access channel.

13. A method, as set forth in claim 12, further comprising:
adapting a priority level for a voice over internet protocol packet service based on a comparison of a referential system parameter and a delay measurement within a provision interval;

dynamically adjusting a system parameter to accommodate a desired voice delay criteria of an air interface based on said adaptive priority setting of each voice over internet protocol packet of said plurality of voice over internet protocol packets;

determining whether a referential measure indicates a longer air interface delay for a specific voice over internet protocol packet user;

if said referential measure indicates a longer air interface delay, setting said priority level lower than said adaptive priority setting; and causing said scheduler to divert a radio resource to the first or second service user with a higher demand.

14. A method, as set forth in claim 1, further comprising:
setting an initial priority level for a specific voice over internet protocol user based on at least one of a provisioned system parameter, a system performance statistic, and a type of said specific voice over internet protocol user during setup of a call;

measuring a delay at an internet protocol header compressor for a voice over internet protocol packet over said downlink channel to dynamically adjust said initial priority level;

adaptively adjusting said initial priority level for said specific voice over internet protocol user based on the measured delay; and if an average delay, in the measured delay, exceeds an upper bound threshold of a provisioned delay budget, setting a priority level to be at least one level higher than said initial priority level.

15. A method, as set forth in claim 14, further comprising:
using a multiplicity of upper bound thresholds for said provisioned delay budget to enable a multiple step size adjustments of said priority level to accommodate the larger delay variation.

16. A method, as set forth in claim 14, further comprising:
if a mean delay, in the measured delay, falls below said upper bound threshold, lowering said priority level to enable one or more voice over internet protocol users different than said specific voice over internet protocol user to be scheduled earlier for reducing said delay.

17. A method, as set forth in claim 14, further comprising:
if synchronization is lost between said internet protocol header compressor and an internet protocol header decompressor, resetting said priority level to a relatively higher level.

18. A method, as set forth in claim 12, further comprising:
using said adaptive priority setting to enable said scheduler to manage a delay experienced by different voice over internet protocol users through a scheduling order and a radio resource assignment to meet a quality of service requirement for all users of a plurality of voice over internet protocol users.

19. A method, as set forth in claim 18, further comprising:
dynamically adjusting a priority level to a relatively higher level to accommodate a measured delay that is larger than a delay experienced by said service user among the first and second service users or dynamically adjusting said priority level to a relatively lower level when the measured delay is relatively smaller than a delay experienced by the service user among the first and second service users;

enabling said scheduler to prioritize said mobile-to-mobile wireless service user or a user near a cell edge when said end-to-end delay becomes larger than a delay experienced by said mobile-to-land wireless service user or a user close to a cell;

de-prioritizing said mobile-to-land user or said user close to said cell with a delay margin to spare; and enabling said scheduler to maximize voice over internet protocol capacity over said downlink channel in said wireless network while maintaining an acceptable level of end-to-end delay for all users including said mobile-to-mobile wireless service user or said user near said cell edge and said mobile-to-land wireless service user or said user close to said cell.

20. A method for controlling service quality of data communications in a wireless network, the method comprising:
providing an indication of the first measured value of the first end-to-end delay that a first service user experiences over a downlink channel shared with a second service user relative to the second measured value of the second end-to-end delay that the second service user experiences, wherein the indication is used for prioritizing transmission of voice over internet protocol packets associated with the first and second service users based on the first and second measured values of the first and second end-to-end delays, wherein the first end-to-end delay and the second end-to-end delay are obtained at an internet protocol header compressor that compresses the voice over internet protocol packets, and wherein the measurements are obtained based on headers attached to the voice over internet protocol packets by the compressor, wherein the first service user is a mobile-to-mobile user and the second service user is a mobile-to-land user, and wherein prioritizing transmission of voice over internet protocol packets comprises de-prioritizing the mobile-to-land user relative to the mobile-to-mobile user.

21. A method, as set forth in claim 20, wherein the first service user is a mobile-to-mobile wireless service user and the second service user is a mobile-to-land wireless service user.

22. A method, as set forth in claim 1, wherein de-prioritizing the mobile-to-land user comprises de-prioritizing the mobile-to-land user when the mobile-to-land user has a delay margin to spare.

23. A method, as set forth in claim 1, wherein prioritizing transmission comprises prioritizing the first service user relative to the second service user when the second service user is close to a cell.

24. A method, as set forth in claim 23, wherein prioritizing the first service user comprises prioritizing the first service user relative to the second service user when the second service user is close to the cell and the second service user has a delay margin to spare.

* * * * *